United States Patent Office

3,772,253
Patented Nov. 13, 1973

3,772,253
PROCESS FOR THE ANIONIC POLYMERIZATION OF LACTAMS
Bert Brassat, Krefeld-Bockum, Germany, assignor to Bayer Aktiengesellschaft, Leverkusen, Germany
No Drawing. Filed May 18, 1972, Ser. No. 254,407
Claims priority, application Germany, May 18, 1971,
P 21 24 497.3
Int. Cl. C08g 20/18
U.S. Cl. 260—78 L                7 Claims

ABSTRACT OF THE DISCLOSURE

An improved process for the production of polyamides by activated anionic polymerization of a polymerizable mixture comprising a lactam, a catalyst and an activator, wherein an aluminum alcoholate is added to said mixture.

This invention relates to an improved process for the activated anionic polymerization of lactams.

It is known that, ideally, the activated anionic polymerization of lactams leads to an equilibrium state in which the composition of the polymerizing mixture is governed by the temperature. Thus, a product composition which still contains approximately 9% of low molecular weight fractions is obtained by the activated anionic polymerization of caprolactam at 220° C. However, this equilibrium composition which represents a minimum in regard to the content of undesirable low molecular weight fractions, is generally not obtained under industrial conditions. There are several reasons for this fact. Thus, in many cases, there is only a limited period of time in which to carry out the polymerization reaction which, unfortunately, is not long enough to complete the polymerization reactions. In cases where the anionic polymerization reaction is carried out in extruders or in injection-molding machines, this period of time is for example the residence time of the polymerizing mixture in the machine.

Another reason for incomplete polymerization lies in the presence of impurities which interfere with the mechanism of the polymerization reaction. These impurities reduce the polymerization velocity and force polymerization to cease before the equilibrium composition is reached so that, even with extended polymerization times, polymers with an increased content of low molecular weight fractions are obtained. In extreme cases, polymerization is completely prevented.

Impurities of this kind generally cannot always be avoided under industrial conditions. Thus, moisture, mineral acids, ammonia, and ammonium salts and also hydrolysis and oxidation products of the lactam, can be present with the lactam as soon as the lactam is synthesized. As a result, standard commercial lactams are frequently contaminated by traces of such impurities.

Another source of impurities which can enter the polymerization mixture are additives, fillers and strengthening materials. Thus, glass fibers which are worked into plastics for strengthening purposes are generally finished with 0.1 to 0.5% by weight of a size. Numerous conventional sizes inhibit the anionic polymerization reaction to a large extent. Furthermore, fillers produced by grinding from natural minerals are frequently worked into plastics. The purity of materials is almost impossible to control; and the type and concentration of impurities inhibiting anionic polymerization reactions can vary from one batch to another.

To a certain extent, air is also a polymerization-inhibiting impurity. Oxidation products which inhibit anionic polymerization reactions are formed particularly readily during anionic polymerization because the basic catalysts present promote atmospheric oxidation. For this reason, the anionic polymerization of lactams is preferably carried out in the absence of air.

Accordingly, the object of this invention is to improve the anionic polymerizability of lactams and, in particular, to eliminate or to reduce the adverse effect upon the anionic polymerization of impurities which enter the lactam during its synthesis, transportation or storage or which are intentionally or unintentionally added to the polymerizable mixture before or during polymerization.

Surprisingly, it has now been found that the required effect can be obtained by adding small quantities of an aluminum alcoholate to the polymerizable mixture. There is as yet no definite explanation for this effect. A chemical reaction between the aluminum alcoholate and the traces of polymerization-inhibiting substances which are consumed by the reaction, is not sufficient in every case for explaining the observed effects. In addition, it must be remembered that, in reactions such as these, the equivalent quantity of an alcohol, which is itself an inhibitor to the anionic polymerization of lactam, is liberated.

It is particularly surprising that, in some cases, the extractable low molecular weight fraction contents obtained by the process in which an aluminum alcoholate is added are even lower than the theoretical values corresponding to the state of equilibrium between the polymer and the monomer at the particular polymerization temperature.

Accordingly the present invention relates to an improved process for the production of polyamides obtained by activated anionic polymerization of a polymerizable mixture comprising at least one lactam having at least 6 ring members, an activator and a catalyst, the improvement comprising the addition of at least one aluminum alcoholate to said mixture.

In the context of the invention, aluminum alcoholates are the aluminum salts of aliphatic and araliphatic monohydric and polyhydric alcohol. Particularly suitable are aluminum alcoholates of alcohols having preferably 2 to 18, most preferably 2 to 4 carbon atoms such as aluminum methylate, aluminum ethylate, aluminum n-propylate, aluminum isopropylate, aluminum n-butylate, aluminum isobutylate, aluminum sec.-butylate, aluminum tert.-butylate, aluminum amyl alcoholate, aluminum hexylate, aluminum stearyl alcoholate, aluminum octadecane diolate and aluminum benzyl alcoholate.

These alcoholates are added to the polymerizable mixture preferably in quantities of from 0.05 to 10% by weight and most preferably in quantities of from 0.1 to 2% by weight based on the polymerizable mixture.

Lactams having at least 6 ring members are suitable such as β-pyrrolidone, ε-caprolactam, oenanthic lactam, caprylic lactam, lauric lactam, the corresponding C-substituted lactams or mixtures thereof.

The catalysts known in the art for the anionic polymerization can be used, especially alkali metal and alkaline earth metal compounds of lactams such as sodium-ε-caprolactam, of aliphatic carbon acids such as sodium, potassium formate, of aliphatic alcohols up to 6 carbon atoms such as sodium-methylate, potassium-butylate or sodium-phenolate and alkali metal and alkaline earth metal hydrides, oxides and carbonates.

The activators known in the art for the anionic polymerization can be used for the polymerization such as isocyanates, especially hexamethylene-diisocyanate, phenylisocyanate, masked isocyanates especially hexamethylene-1,6-bis-(carbamide-caprolactam), carbodiimides, carbonimides or triazines.

The invention is as useful for the discontinuous production of polyamides as for the continuous production.

The invention is illustrated by, but by no means limited to, the following examples:

EXAMPLE 1

A double-shaft extruder with a screw diameter of 43 mm. and a length of 30 D is used as the polymerization apparatus. It comprises five zones which can be heated independently of one another. The feed zone is cooled with water, the remaining heating zones being tempered as follows: 180/230/230/230° C.; die temperature 250° C.

The extruder is filled with a polymerizable mixture of the following composition:

1100 parts of caprolactam (standard quality);
5 parts of sodium caprolactamate;
4 parts of N-benzyl acetamide; and
10 parts of the addition product of hexamethylene diisocyanate and caprolactam.

A polyamide product containing 11.5% of extractable low molecular weight fractions is obtained. If 3 parts of aluminum isopropylate are added to the polymerizable mixture before extrusion, the product has an extract content of only 6.3%.

EXAMPLE 2

Two glass flasks each with a capacity of 250 ml. each contain a powdered mixture of 113.0 g. of caprolactam;
0.7 g. of sodium lactamate;
1.6 g. of behenic acid cyclohexyl amide, and
1.2 g. of adduct of hexamethylene diisocyanate and caprolactam The contents of the first flask are polymerized as follows in the absence of air:

The flask is evacuated twice to an internal pressure of 10 torr and filled with nitrogen on each occasion. Thereafter, the flask is lowered into an oil bath maintained at 210° C. while its contents are stirred and more nitrogen passed through. The mixture fuses and then polymerizes. The period of time elapsing from immersion to the point at which the mixture becomes unstirrable is measured. It is a measure of the polymerization velocity and is referred to hereinafter as the induction time. In the case of the second flask, evacuation is omitted, nor is any nitrogen passed through. Table 1 shows that the induction time is considerably lengthened under these conditions.

The tests are repeated with aluminum isopropylate added. The table shows that the induction time is only minimally extended by the air present.

TABLE 1

| Aluminum isopropylate added, g. | Induction time under nitrogen | Induction time in air |
|---|---|---|
| None | 6 mins., 40 secs. | 15 mins. (polymerization incomplete). |
| 0.3 | 4 mins., 20 secs. | 4 mins., 42 secs. |

EXAMPLE 3

A vertically arranged tamping screw is flanged on to the feed opening of the double-shaft extruder described in Example 1. Otherwise, the machine conditions are as in Example 1. The polymerizable mixture has the following composition:

1100 parts of caprolactam;
12 parts of the adduct of hexamethylene diisocyanate and caprolactam;
6 parts of sodium lactamate;
4 parts of N-benzyl acetamide;
115 parts of chopped glass fibers of the Owens Corning 801 ZY type® (size unkonwn) and 3 parts of aluminum isobutylate.

A glass-fiber-reinforced polyamide granulate with an extractable low molecular weight fraction content of 10.7% is obtained. Repetition of the test without aluminum isobutylate results in a product with an extract content of 16.9%.

If the aforementioned glass fibers are replaced by glass fibers of the Gevetex K43 type® (size unknown), the extract contents are 11.1% and 16.3%, respectively.

EXAMPLE 4

A mixture of 110 g. of caprolactam and 0.5 g. of sodium lactamate is quickly fused while stirring in an open glass beaker and immediately placed in a drying cabinet kept at 80° C. After the residence time quoted in the table, 1.0 g. of the addition product of hexamethylene diisocyanate and caprolactam is added together with the specified quantity of aluminum isopropylate. The glass beaker is closed, introduced into an oil bath maintained at 215° C. and its contents stirred while nitrogen is passed over. The period of time elapsing from the moment an internal temperature of 100° C. is exceeded to the moment at which the mixture becomes unstirrable, is measured. It is a measure of the polymerization velocity and is referred to in Table 2 as the polymerization time. As the table shows, the melt loses its polymerizability after a while on standing without any cover in the drying cabinet. The critical residence time in the drying cabinet is considerably increased when aluminum isopropylate is added.

TABLE 2

| Residence time in air at 80° C. (mins.) | Quantity of aluminum isopropylate added (g.) | Polymerization time |
|---|---|---|
| 4 | | 9 mins. |
| 4 | 0.3 | 4 mins., 30 secs. |
| 15 | | Polymerization incomplete. |
| 15 | 0.3 | 4 mins., 40 secs. |
| 30 | | No polymerization. |
| 30 | 0.3 | 5 mins. |
| 60 | 0.3 | 5 mins., 50 secs. |
| 120 | 0.3 | 7 mins., 30 secs. |

EXAMPLE 5

A 250 ml. capacity glass flask equipped with a gas inlet pipe, an internal thermometer and stirring mechanism contains a powdered mixture of 110.0 g. of caprolactam;
0.5 g. of sodium lactamate;
0.6 g. of N-benzyl acetamide; and
1.0 g. of the addition product of hexamethylene diisocyanate and caprolactam Aluminum isopropylate and filler are added to the particular mixture in the quantities indicated in the table. The flask containing the mixture is then lowered into an oil bath heated to 215° C. while its contents are stirred and nitrogen passed over. The mass initially fuses and then polymerizes. The period of time elapsing from the moment an internal temperature of 100° C. is exceeded to the moment at which the mixture becomes unstirrable, is measured. It is a measure of the polymerization velocity and is referred to hereinafter as the polymerization time. The results are set out in Table 3.

TABLE 3

| Filler | Aluminum isopropylate, g. | Polymerization time |
|---|---|---|
| 33 g. of talcum | | 7 mins. |
| Do | 0.3 | 4 mins., 30 secs. |
| 22 g. of Micro Mica®[1] | | No polymerization. |
| Do | 0.3 | 6 mins., 30 secs. |

[1] A product of Messes. C.H. Erbsloh, Dusseldorf.

EXAMPLE 6

The apparatus described in Example 5 contains a powdered mixture of 110.0 g. of caprolactam;
0.5 g. of sodium lactamate;
1.0 g. of the addition product of hexamethylene diisocyanate and caprolactam;
0.6 g. of N-benzyl acetamide;
2,1 g. of aqueous lactam (2% $H_2O$); and
0.3 g. of the particular aluminum alcoholate (cf. table)

The aqueous lactam is prepared by dissolving 2% by weight of water in a caprolactam melt at a temperature of 70° C. and casting the melt in the form of a thin layer on to a cold plate. The polymerization times are measured as described in Example 5. The results obtained are set out in Table 4.

TABLE 4

| Aluminum alcoholate added | Polymerization time | Low molecular weight fractions in percent |
|---|---|---|
| None | 5 mins., 40 secs | 11.7 |
| Isopropylate | 4 mins., 10 secs | 6.5 |
| tert.-Butylate | do | 6.8 |
| sec.-Butylate | 4 mins., 30 secs | 7.2 |
| Ethylate | 5 mins., 10 secs | 9.1 |

EXAMPLE 7

The apparatus described in Example 5 contains a mixture of 110.0 g. of caprolactam;
0.5 g. of sodium lactamate;
0.6 g. of N-benzyl acetamide; and
1.0 g. of the addition product of hexamethylene diisocyanate and caprolactam The impurity indicated, in the form of a 2% concentrate in caprolactam (prepared as in Example 6) and the specified quantity of aluminum isopropylate are also added, and the polymerization time determined as in Example 5. The results are set out in Table 5.

EXAMPLE 8

TABLE 5

| Impurity added [1] | Aluminum isopropylate in g. | Polymerization time | Remarks |
|---|---|---|---|
| 2.5 g. of mixture A | | 5 mins., 20 secs | Extract content 12.3%. |
| Do | 0.3 | 4 mins., 10 secs | Extract content 6.4%. |
| 3.0 g. of mixture A | | 7 mins., 20 secs | Extract content 12.3%. |
| Do | 0.4 | 4 mins., 50 secs | Extract content 6.9%. |
| 3.5 g. of mixture A | | | Polymerization incomplete. |
| Do | 0.4 | 7 mins | Extract content 7.4%. |
| 4.0 g. of mixture A | | | No polymerization. |
| Do | 0.4 | 7 mins., 50 secs | Extract content 21%. |
| 20 g. of mixture B | | 5 mins., 40 secs | |
| Do | 0.3 | 4 mins., 20 secs | |
| 1.0 g. of mixture C | | 5 mins | Extract content 12.2%. |
| Do | 0.2 | 4 mins., 10 secs | Extract content 6.9%. |

[1] Mixture A=Aqueous caprolactam (2% $H_2O$). Mixture B=Caprolactam containing butyl amine (2% $C_4H_9NH_2$). Mixture C=Acid-containing lactam (2% semi-concentrated $H_2SO_4$).

Polymerization is carried out in a screw injection-moulding machine with a three-zone screw 88 mm. in diameter and 12 D long. It has three heating zones which are heated to 230/230/250° C. A rectangular panel mould kept at room temperature is used as the mould. The injection mouldings measure 70 x 55 x 5 mm. A ram extruder whose plunger can be hydraulically moved up and down is flanged onto the feed opening. With the plunger in its upper position, the solid polymerizable mixture can be introduced into the extruder through a laterally arranged hopper. The lower part of the cylinder of the extruder is electrically heated to 90° C. When the plunger is lowered, the lactam mixture beneath it is initially compressed, partly fuses on the hot cylinder wall and is forced into the feed opening of the injection moulding machine before a solid plug can form. The machine is fed with a polymerizable mixture of the following composition:

1100 parts of caprolactam (standard quality);
5 parts of sodium caprolactamate;
4 parts of N-benzyl acetamide, and
10 parts of the addition product of hexamethylene diisocyanate and caprolactam After the feed cycle, the mixture polymerizes for 90 seconds and is then injected into the mould. After another 30 seconds, the complete injection moulding can be removed. It has an extract content of 14.2%. If 3 parts of aluminum isobutylate are added to the polymerizable mixture, the injection mouldings obtained have an extract content of 8.7%.

EXAMPLE 9

The apparatus described in Example 5 contains a mixture of 170.0 g. of lauric lactam
0.5 g. of sodium caprolactamate
1.0 g. of the addition product of hexamethylene diisocyanate and caprolactam
2.1 g. of aqueous caprolactam (2.0% of water)

The oil bath has a temperature of 180° C. The polymerization time measured as in Example 5 is 8 minutes, 40 seconds. Repetition of the test following the addition of 0.3 g. of aluminum tert.-butylate gives a polymerization time of 4 minutes, 10 seconds.

I claim:
1. In the production of moldable polyamides by the anionic polymerization of a polymerizable mixture of at least one lactam having at least 6 ring members, activator and an alkali or alkaline earth metal lactamate as catalyst, wherein the polymerization takes place in contact with air, in the presence of strengthening material or in the presence of traces of moisture, the improvement which consists of adding at least one aluminum alcohol to the polymerizable mixture.

2. A process as claimed in claim 1 wherein an aluminum alcoholate derived from an aliphatic or araliphatic mono- or poly-alcohol is added.

3. A process as claimed in claim 1, wherein an aluminum alcoholate of an alcohol having 2 to 18 carbon atoms is added.

4. A process as claimed in claim 1, wherein aluminum methylate, aluminum ethylate, aluminum n-propylate, aluminum isopropylate, aluminum n-butylate, aluminum sec-butylate, aluminum t-butylate, aluminum isobutylate, aluminum amylate, aluminum octadecane diolate, aluminum stearyl alcoholate or aluminum benzylate is added.

5. A process as claimed in claim 1, wherein 0.05 to 10% by weight of the aluminum alcoholate based on the polymerizable mixture, are added.

6. A process as claimed in claim 1, wherein 0.1 to 2% by weight of the aluminum alcoholate, based on the polymerizable mixture, are added.

7. A process as claimed in claim 1, wherein β-pyrrolidone, ε-caprolactam, lauric lactam, oenanthic lactam, caprylic lactam, a corresponding C-substituted lactam or a mixture thereof is polymerized.

References Cited

UNITED STATES PATENTS 3,450,662  6/1969  Tierney _____ 260—78 L X
3,451,963  6/1969  Tierney et al. _____ 260—78 L X L. M. PHYNES, Assistant Examiner WILLIAM H. SHORT, Primary Examiner U.S. Cl. X.R.

260—37 N